(No Model.)

S. A. MOULTON.
TRAY FOR DRYING FRUIT.

No. 425,816. Patented Apr. 15, 1890.

Witnesses:
J. H. Nourse
H. C. Lee.

Inventor,
Stillman A. Moulton
By Dewey & Co.
Attys

UNITED STATES PATENT OFFICE.

STILLMAN A. MOULTON, OF CAMPBELL, CALIFORNIA.

TRAY FOR DRYING FRUIT.

SPECIFICATION forming part of Letters Patent No. 425,816, dated April 15, 1890.

Application filed November 22, 1889. Serial No. 331,220. (No model.)

*To all whom it may concern:*

Be it known that I, STILLMAN A. MOULTON, a citizen of the United States, residing at Campbell, Santa Clara county, State of California, have invented an Improvement in Trays for Drying Fruit; and I hereby declare the following to be a full, clear, and exact description of the same.

My invention relates to the class of fruit-drying trays; and it consists in the novel construction of tray hereinafter fully described, and specifically pointed out in the claim.

The objects of my invention will appear in the course of the following description.

Figure 1:
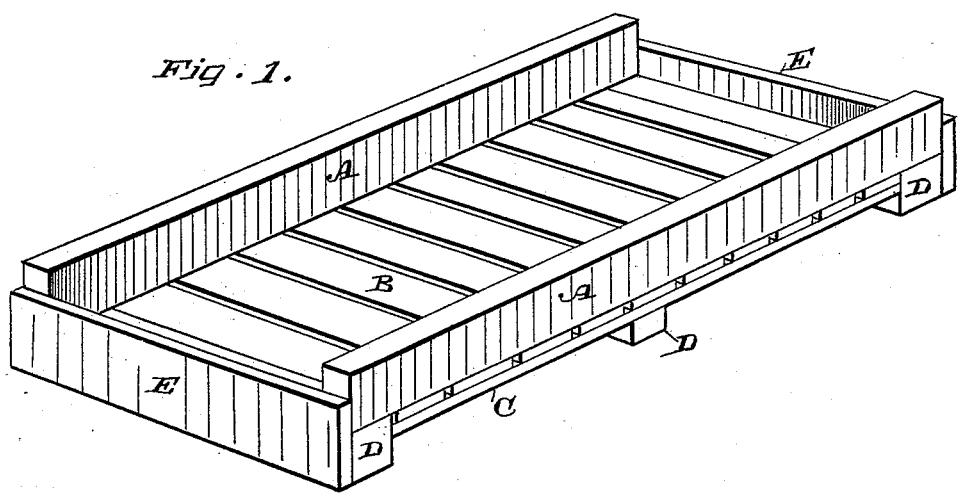
Figure 2:
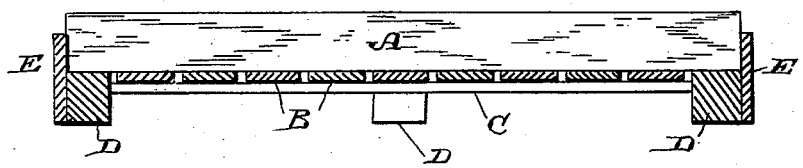
Figure 3:
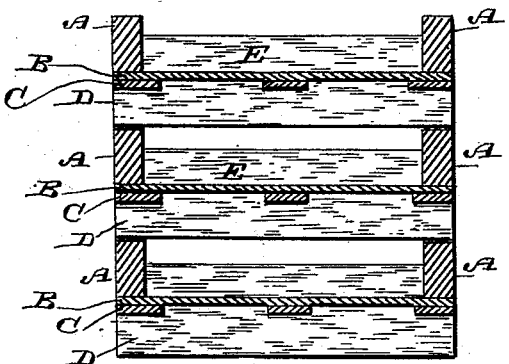

Referring to the accompanying drawings for a more complete explanation of my invention, Figure 1 is a perspective view of my tray. Fig. 2 is a longitudinal vertical section of same. Fig. 3 is a view showing a pile of my trays in order to illustrate the objects of the construction.

The tray is made of side pieces A, transverse bottom pieces B, longitudinal bottom strips C, bearing-pieces D, and transverse end pieces E.

Any suitable dimensions may be given to the tray. The bearing-pieces D project below the bottom of the tray, as shown, and the transverse end pieces E do not extend up to the level of the tops of the side pieces A.

The points of novelty lie in the bearing-pieces and in the end pieces. In drying fruit it is not so much an object to expose the fruit directly to the sun's rays as it is to provide suitable air-passages or ventilation for it. Now in piling the trays, as shown in Fig. 3, one on another the bearing-pieces D of each tray rest on the side pieces A of the underlying tray, and as they extend down below the tray-bottoms the latter are raised up from the tops of underlying trays, thereby providing free transverse passages for the air between the tray-tops and the bottom of the one immediately above it. The end pieces E being lower than the side pieces A provide for longitudinal air-passages, and thus complete and free ventilation is provided for the entire tray pile in all directions. The advantage of this is well known to fruit-men and need not be herein specifically pointed out. There are other advantages of the construction herein described, some of which may be mentioned. The bearing-pieces D raise up the tray-bottoms from the ground when all are spread out directly on the ground, and then when they are severally taken up to pile them small pieces of dirt, gravel, and other extraneous matters do not cling to the tray-bottoms and fall into underlying trays, a disadvantage very marked in the use of trays whose bottoms lie directly on the ground. Another advantage is that the bearing-pieces D serve as good and firm holds or grips in lifting the trays.

Having thus described my invention, what I claim as new, and desire to secure by Letters Patent, is—

A tray for drying fruit, composed of the side pieces A, bearing-pieces D under and projecting below the tray-bottom and having a length greater than the distance between the side pieces, and the end pieces E, the tops of which are below the level of the tops of the side pieces, whereby, when the trays are piled, transverse and longitudinal air-passages are formed between the trays, substantially as herein described.

In witness whereof I have hereunto set my hand.

S. A. MOULTON.

Witnesses:
CHAS. P. OWEN,
J. D. CANEL.